United States Patent
Rasch et al.

(10) Patent No.: US 6,783,151 B2
(45) Date of Patent: Aug. 31, 2004

(54) AIRBAG ARRANGEMENT

(75) Inventors: Georg Rasch, Bühl (DE); Stefan Wiegert, Ulm (DE); Reiner Heuschmid, Neuburg (DE); Andreas Riedel, Vöhringen (DE); Franz Fürst, Buxheim (DE); Mehmet Cakmak, Ingolstadt (DE); Sven Schawe, Braunschweig (DE); Tycho von Jan, Gifhorn (DE); Norbert Küster-Claus, Isenbüttel (DE)

(73) Assignees: Takata-Petri (Ulm) GmbH, Ulm (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 09/833,213

(22) Filed: Apr. 12, 2001

(65) Prior Publication Data

US 2002/0047253 A1 Apr. 25, 2002

(30) Foreign Application Priority Data

Apr. 12, 2000 (DE) .......................................... 100 18 170

(51) Int. Cl.$^7$ ............................................. B60R 21/24
(52) U.S. Cl. .................... 280/729; 280/730.2; 280/739; 280/743.2
(58) Field of Search ............................. 280/730.2, 739, 280/743.1, 743.2, 729

(56) References Cited

U.S. PATENT DOCUMENTS

| | | | | |
|---|---|---|---|---|
| 5,249,824 A | * | 10/1993 | Swann et al. ................ | 280/729 |
| 5,282,646 A | * | 2/1994 | Melvin et al. ........... | 280/728.1 |
| 5,489,117 A | * | 2/1996 | Huber ........................ | 280/738 |
| 5,762,367 A | * | 6/1998 | Wolanin ...................... | 280/736 |
| 5,829,779 A | * | 11/1998 | Nakashima et al. ........ | 280/729 |
| 5,941,559 A | * | 8/1999 | Rudolf et al. ................ | 280/729 |
| 5,951,038 A | * | 9/1999 | Taguchi et al. ............. | 280/729 |
| 5,957,486 A | * | 9/1999 | Taguchi et al. ............. | 280/729 |
| 5,957,490 A | * | 9/1999 | Sinnhuber .................... | 280/735 |
| 6,042,141 A | * | 3/2000 | Welch et al. ................ | 280/729 |
| 6,073,959 A | * | 6/2000 | Heinz et al. ................. | 280/729 |
| 6,086,092 A | * | 7/2000 | Hill ............................ | 280/729 |
| 6,164,696 A | * | 12/2000 | Ellerbrok et al. ........... | 280/729 |
| 6,186,540 B1 | * | 2/2001 | Edgren ....................... | 280/735 |
| 6,209,908 B1 | * | 4/2001 | Zumpano .................... | 280/729 |
| 6,241,283 B1 | * | 6/2001 | Zarazua .................... | 280/728.1 |
| 6,254,121 B1 | * | 7/2001 | Fowler et al. .............. | 280/729 |

FOREIGN PATENT DOCUMENTS

JP          04244453          *  9/1992

* cited by examiner

*Primary Examiner*—Paul N. Dickson
*Assistant Examiner*—Deanna Draper
(74) *Attorney, Agent, or Firm*—Foley & Lardner LLP (57) ABSTRACT

An airbag arrangement for a motor vehicle includes an airbag deployable in a direction to protect a vehicle occupant and an arrangement for limiting the unfolding impulse of the airbag upon an obstacle placed in a deployment path of the airbag to reduce the unfolding impulse transferred to the obstacle. The limitation arrangement, which can be, for example, a sheath, aperture in the airbag, can respond to the resistance of the occupant located in the deployment path, which is outside a normal seating position, or respond to a lack of resistance from the passenger. As the limitation arrangement limits the unfolding impulse of the airbag, it reduces the maximum unfolding impulse transferable to the occupant located outside the normal seating, in the deploying path.

27 Claims, 7 Drawing Sheets

AIRBAG ARRANGEMENT

BACKGROUND

An airbag for motor vehicles is designed to protect a vehicle occupant in the event of an accident. Problematic situations arise in cases where the vehicle occupant is not in his or her normal sitting position when the airbag deploys. Such situations, also known as "out of position" or OOP cases, are particularly significant for children who are not accommodated as prescribed in children's seats. The present invention addresses this problem.

SUMMARY OF THE INVENTION

The present invention relates to an airbag arrangement for a motor vehicle having at least one inflatable airbag deployable in a direction to protect a vehicle occupant, and at least one arrangement associated with the airbag for limiting an unfolding impulse of the airbag upon an obstacle placed in a deployment path of the airbag to reduce the unfolding impulse transferred to the obstacle.

Under a normal situation, the airbag is inflated in the direction to intercept the occupant to cushion the impact. The limiting arrangement for limiting the inflating impulse of the airbag can be influenced by an obstacle, such as the occupant. The limiting arrangement can reduce the inflating impulse directed to the obstacle, which is located in the path of the airbag expansion or movement.

The limiting arrangement is designed to prevent the airbag from deploying its full unfolding impulse in the OOP cases, i.e., when the respective vehicle occupant is out of his normal position and situated in the path of the airbag deployment, but allows full unfolding impulse in the normal unimpeded situation, i.e., when the vehicle occupant is in his normal position. Since an obstacle, such as a vehicle occupant, influences the limitation arrangement, it automatically recognizes the OOP cases, whereupon the present limiting arrangement thereof automatically reduces the unfolding impulse of the airbag.

The limitation arrangement can be formed such that it responds based on the resistance of the obstacle located outside the normal seating position, in the deployment path. The resistance created by the obstacle against the deploying airbag thus controls the unfolding or inflating impulse. Since the limitation arrangement responds to the obstacle this way, the occupant who is not in his or her normal sitting position and located in the deployment path of the airbag triggers the response of the limitation arrangement to reduce the inflation force of the airbag.

Alternatively, it is also possible according to the present invention for the limitation arrangement to be formed such that it responds to the lack of resistance from the occupant. In this case, the limitation arrangement can detect an OOP situation by the lack of resistance, which is normally present if the occupant is properly located in the normal seating position. The present airbag arrangement allows a greater protection for the respective vehicle occupant, even in the OOP cases.

In one embodiment of the invention, the limitation arrangement can comprise the airbag sheath. The airbag sheath, in the case of a folded airbag, can be made to have a lower degree of unfolding in one direction, e.g., in the direction of deployment, than approximately perpendicular to that direction.

It is therefore possible to achieve a limitation of the unfolding impulse of the airbag sheath and thus a reduction in its inflation force without any additional means, simply through the uneven degree of unfolding of the airbag, uneven particularly with respect to the direction of deployment. The inflation of the airbag is substantially harmonized by the lower degree of unfolding in the direction of airbag deployment so that the inflation process is associated with a substantially lower force or drive. Here, the airbag is inflated predominantly in the direction of deployment due to the higher degree of unfolding perpendicular to the direction of deployment. The airbag is preferably folded together such that it has a large expansion perpendicular to the direction of deployment and takes up at least the substantial part of the space available in this direction. This allows an extremely areal arrangement of the folded airbag to be achieved, which substantially reduces its unfolding impulse. The direction of the lower degree of unfolding does not have to agree exactly with the direction of deployment, but can also deviate therefrom.

The folded airbag can here be arranged areally along a contact surface located in the deployment path and has, in particular, areal contact to the contact surface. The contact surface preferably extends at least approximately perpendicular to the direction of deployment.

It is further preferred to have the contact surface formed by an airbag cover. The airbag can, for example, be arranged at or in a vehicle seat, with a seat cover provided as the airbag cover, which is initially expandable and which can subsequently be ripped open, particularly by the inflation of the airbag. The seat cover can here be provided with a ripping seam.

With an expandable seat cover, the airbag arranged according to the invention can be positioned under the seat cover in a favorable manner with respect to the OOP case at the beginning of the inflation process before it deploys further by the ripping open of the seat cover.

According to a further preferred embodiment of the invention, the limitation arrangement can be configured such that when the obstacle is located outside the normal seating position, in the deployment path, the obstacle blocks the deployment path to limit the space for deploying the airbag. The limited space configures the airbag to prevent the airbag from reaching a threshold pressure in the airbag, which is only reachable in a normal protection case resulting from opposite external reaction forces generated when the occupant is in a normal seating position.

The inflating airbag thus can be under less stress in the OOP case than in the normal protection case. For example, in the case of a side airbag arranged at the side of the backrest of a vehicle seat, the high pressure required to cancel the limitation is achieved in the airbag by the reaction forces exerted by the occupant in his normal position and the side panel of the vehicle when the airbag forces its way between the vehicle occupant and the side panel during inflation.

These reaction forces are not present in the OOP case so that the pressure build-up required to break through the limitation is not carried out in the airbag and the airbag is inflated within the limitation, whereby the unfolding impulse and thus the inflation force of the airbag is reduced.

In another embodiment according to the present invention, the limitation arrangement is formed by a limitation sheath surrounding the folded airbag at least partially, and whose maximum expandability in the direction of deployment is smaller than that of the airbag. The limitation sheath can be attached to that assembly of the vehicle at or in which the airbag is arranged, for example at a vehicle seat or a seat cover. Alternatively, the limitation sheath can also be attached to the airbag itself. It is further possible to provide the limitation sheath as a component of the airbag.

According to another embodiment of the present invention, the airbag comprises at least two sections, a primary section and a secondary section, that are inflatable sequentially one after another. The limitation arrangement can comprise at least one valve between these sections. The valve can be closed when the folded airbag is blocked by the resistance of the obstacle located outside the normal position and can be opened by the inflation of the primary section of the airbag, which is inflatable first if there is no such resistance.

A vehicle occupant located outside his normal position automatically ensures that the valve arranged between the two part volumes of the airbag remains closed. The inflation volume of the airbag thus remains limited to the volume of the primary section, whereby the inflation force of the airbag is reduced in a manner advantageous in the OOP case. The valve can be closed by the folded secondary section of the airbag.

The valve can be formed by a nozzle section formed with at least one aperture. The nozzle section can be pushed over, folded, over, flipped over or bent over, in particular against the direction of deployment, to block the aperture. This nozzle section can be formed, in particular, tubular, hose, or snorkel configuration. The cross-section of this section can be approximately circular, but generally can have any geometry deviating from a circular shape.

The nozzle section forming the valve can be formed at a partition wall arranged in the airbag sheath, separating the two sections of the airbag from one another. The partition wall can be a material layer sewn into the airbag sheath.

According to a further variant of the invention, the limitation arrangement can comprise at least one discharge aperture formed in the airbag sheath. The aperture is closed in the normal protection position, but allows gas to escape when an obstacle blocks the airbag.

The gas can be blown into the airbag with at least one gas generator to inflate the airbag. The gas can escape from the airbag through the discharge aperture in the OOP case, whereby the unfolding impulse of the airbag is reduced. The closing the discharge opening in the normal protection case ensures that the airbag can be fully inflated and can assume its protective position.

The limitation arrangement can further include a closing arrangement for closing the discharge aperture arranged in the airbag or airbag sheath. The closing arrangement is configured to close the aperture when the airbag is deployed without the obstacle in the deployment path. That is, it is switchable to at least partially close the aperture when unfolding of the airbag increases in the normal protection case.

This way, a reversible closure for the discharge opening is created by the unfolding of the airbag, with such closure being automatically switched to the state closing the discharge aperture in the normal protection case in which the airbag can unfold without hindrance. The unfolding of the airbag is blocked in the OOP case by the obstacle formed by the occupant located outside his normal position so that the closing arrangement cannot be switched to the closing position. The discharge aperture consequently remains open in the OOP case so that gas can escape from the airbag, whereby its unfolding impulse is reduced.

The closing arrangement can comprises at least one material layer connected, in particular sewn, to the airbag sheath, with the connection being releasable at least in regions by the inflating of the airbag.

It is advantageous here for a connection releasable by the inflating of the airbag to be provided in a region of the airbag located at the front in the direction of deployment, while the material layer is fixed to the airbag sheath in an inflation-resistant manner in a region located at the back in the direction of deployment.

In another embodiment, the closing arrangement, formed in particular by a material layer, is connected in an inflation-resistant manner to the airbag sheath, with the material layer contacting the airbag sheath and closing the discharge aperture at least in part in the normal protection case with the airbag inflated at least in part.

It can be achieved this way, without releasable connections between the closing arrangement, i.e., the material layer, and the airbag sheath and by a corresponding design and/or arrangement of the material layer, that the material layer contacts the airbag sheath and closes the discharge aperture at an advanced stage of the inflation process. The advanced stage of the inflation process required for a closing of the discharge aperture is not achieved in the OOP case due to the vehicle occupant forming an obstacle, which is in the way of the deploying airbag so that the discharge aperture remains in an unclosed state and gas can escape from the airbag, whereby the unfolding impulse of the airbag and thus its inflation force is reduced.

According to a further variant embodiment according to the invention, the discharge aperture can be moved away from an external closing surface at least partly closing the discharge aperture in the normal protection case by the inflation of the airbag when the obstacle is outside the normal position.

The limitation arrangement formed by the discharge opening thus responds here to the lack of resistance of the obstacle by creating a gas escape possibility by the discharge aperture moving away from the closing surface, whereby the unfolding impulse of the airbag is reduced. In contrast, when a vehicle occupant assuming his or her normal position forms the obstacle in the normal protection case, the airbag cannot deploy in a manner such that the discharge aperture is moved away from the closing surface. Since the discharge aperture remains at least partly closed in the normal protection case, the airbag can be inflated in the preset manner and meet its protective function.

The closing surface can be formed by the assembly of the vehicle at or in which the airbag is arranged, for example by a side panel of the vehicle or by a vehicle seat.

The airbag arrangement can be a side airbag arrangement integrated in a vehicle seat or in a vehicle side panel. The invention can, however, generally be employed with any imaginable airbag arrangement, e.g., in conjunction with a front airbag arrangement for the driver or front-seat passenger or with airbag arrangements arranged in the corresponding positions relative to a vehicle seat in order to protect certain body regions of an occupant, e.g., the knee or the feet.

The various embodiments and features of the limitation arrangements described above, and in detail below, can be combined with one another.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Figure 1A:
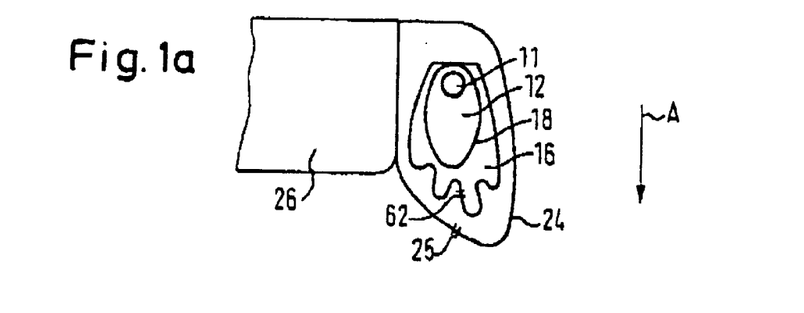
FIGS. 1a–1c illustrate an airbag arrangement according to an embodiment of the invention serving as a side airbag and integrated in a vehicle seat.

The airbag arrangement arranged according to FIG. 1a, formed in a projecting side region of a backrest of a vehicle seat 26, comprises a gas generator 11, an airbag 12, and a limitation sheath 16. The sheath 16 is provided with a ripping seam 62, surrounds the airbag 12, and serves as an arrangement to limit the unfolding impulse of the airbag 12. The seat cover 24 limits the vehicle seat 26 in the direction of deployment A of the airbag 12.

Figure 1B:
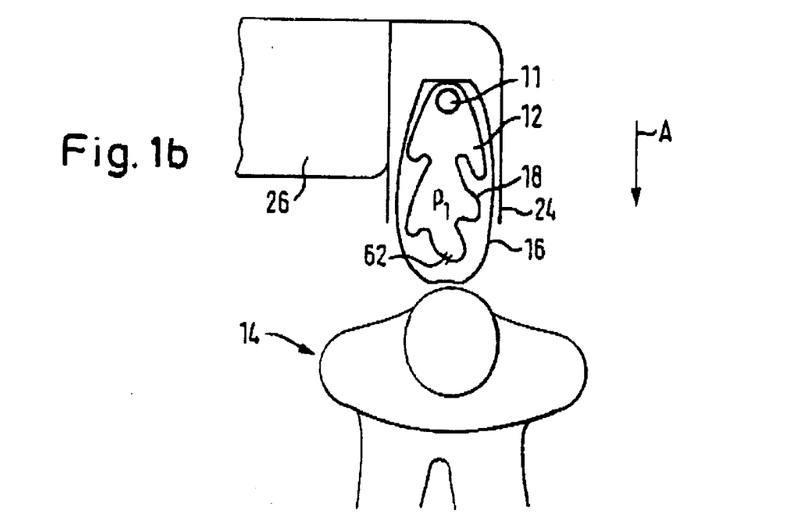

FIG. 1b shows the OOP case in which a vehicle occupant 14 does not assume his normal position, but is located in the deployment path of the airbag 12, and thus forms an obstacle to the deploying airbag 12. When the gas generator 11 is triggered in the event of an accident, the airbag 12 deploys and expands the limitation sheath 16, ripping open the seat cover 24 to reveal the sheath 16. As no force, directed perpendicularly to the direction of deployment A, is exerted on the deploying airbag 12, only a comparatively low pressure $P_1$ is built up in the airbag 12. Thus, the unfolding impulse or the inflation force of the airbag 12 is reduced relative to the normal protection case, which is explained below. The expansion geometry of the airbag 12 is limited in the OOP case by the limitation sheath 16, whose maximum expandability in the direction of deployment A is smaller than that of the airbag 12.

Figure 1C:
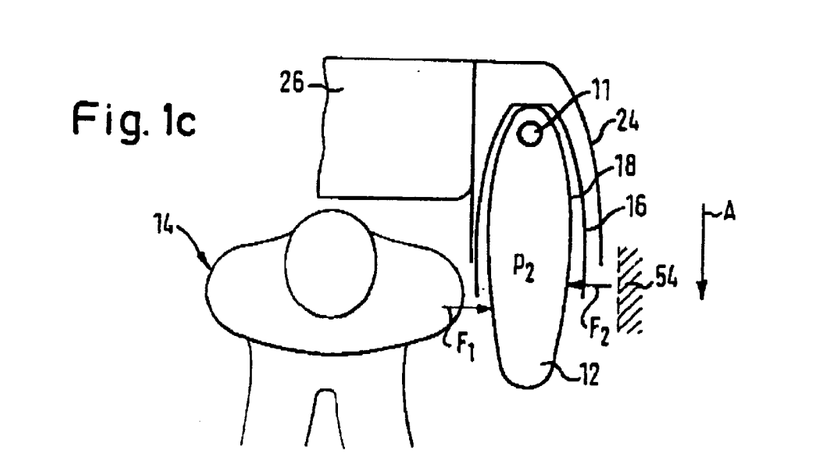

In the normal protection case, which is shown in FIG. 1c, the airbag 12 must force its way between the vehicle occupant 14 and the vehicle side panel 54 so that forces $F_1$, $F_2$, directed perpendicularly to the direction of deployment A, exert an effect on the deploying airbag. The airbag 12 is thus under a stronger load than in the OOP case, whereby a pressure $P_2 > P_1$ is built up in the airbag 12. The ripping seam 62 (see FIG. 1a) of the limitation sheath 16 can be torn open by the deploying airbag because of the higher inner pressure $P_2$, whereby the limitation of the expansion geometry effective in the OOP case (see FIG. 1b) is overcome. The airbag 12 can thus move by inflation into its protective position in which the vehicle occupant 14 is protected from the side impact.

The airbag arrangement according to the invention does not pose problem for the occupant 14 located in the deployment path of the airbag 12, i.e., outside the normal sitting position, due to the limitation of the expansion geometry of the airbag 12 posed by the limitation sheath 16 in the OOP case. In this case, the unfolding impulse and thus the inflation force of the airbag 12 is reduced.

Figure 2A:
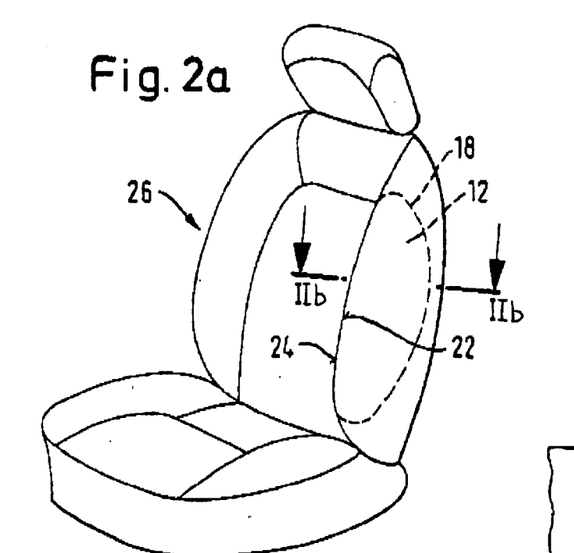
FIGS. 2a–2c illustrate an airbag arrangement according to another embodiment of the invention serving as a side airbag.
Figure 2B:
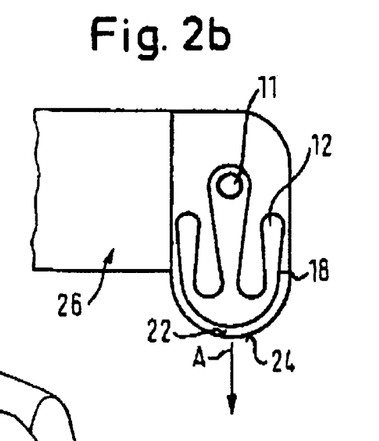
Figure 2C:
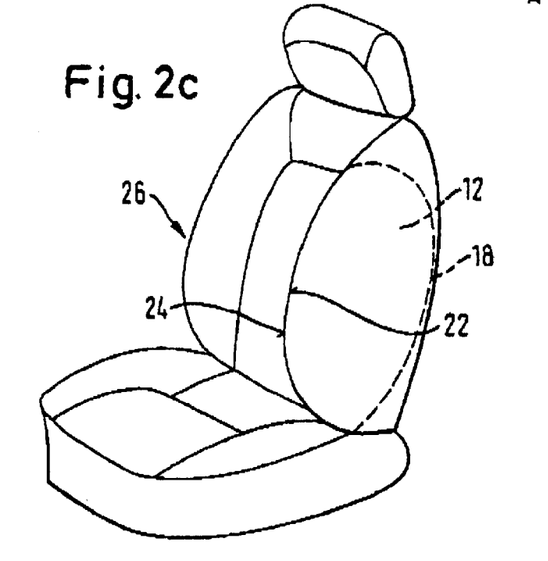

FIGS. 2a–2c show an airbag arrangement also arranged at the side in a backrest of a vehicle seat 26. Here, the airbag arrangement comprises an airbag 12 having an airbag sheath 18 and a gas generator 11. FIG. 2b shows a horizontal section along the line IIb—IIb of FIG. 2a in the region of the airbag arrangement.

No additional means for limiting the unfolding impulse are needed in this embodiment. The limitation arrangement according to the invention is formed in this case by the arrangement of the airbag sheath 18.

The airbag 12 is arranged folded together at the vehicle seat 26 in the starting condition according to FIGS. 2a and 2b such that it contacts the inner side 22 of the seat cover 24 in an areal manner. The airbag 12 is arranged so that it is has the largest possible, areal expansion in a plane extending at least approximately perpendicular to the direction of deployment A. The airbag 12 is therefore already unfolded to a high degree in this plane and thus has a much higher degree of unfolding in this plane, i.e., in directions approximately perpendicular to the direction of deployment A, than in the direction of deployment A.

FIG. 2b shows the folding of the airbag 12 in a horizontal section. As a result of the extensive or complete unfolding of the airbag 12 approximately perpendicular to the direction of deployment A, when the airbag 12 is inflated, its unfolding is carried out approximately only in one dimension, namely in the direction of deployment A.

The seat cover 24 has sufficient expandability so that the airbag 12 can first be positioned below the seat cover, as is shown in FIG. 2c, before the gas generator 12 is triggered. When the seat cover 24 is ripped open from a certain inflation pressure of the airbag 12, the unfolding impulse and thus the inflation force of the airbag 12 already deploying in a partly inflated state is substantially reduced with respect to an airbag with differently configured limitation arrangement disclosed here. And the folded airbag/seat cover combination forms a compact package.

The areal arrangement of the airbag 12 according to the invention results in a high harmonization of the inflation procedure, whereby the inflation of the airbag 12 is carried out in a substantially less aggressive manner. The seat cover 24 can be provided with one or more ripping seams by means of which the point in time of the ripping can be preset directly.

Figure 3A:
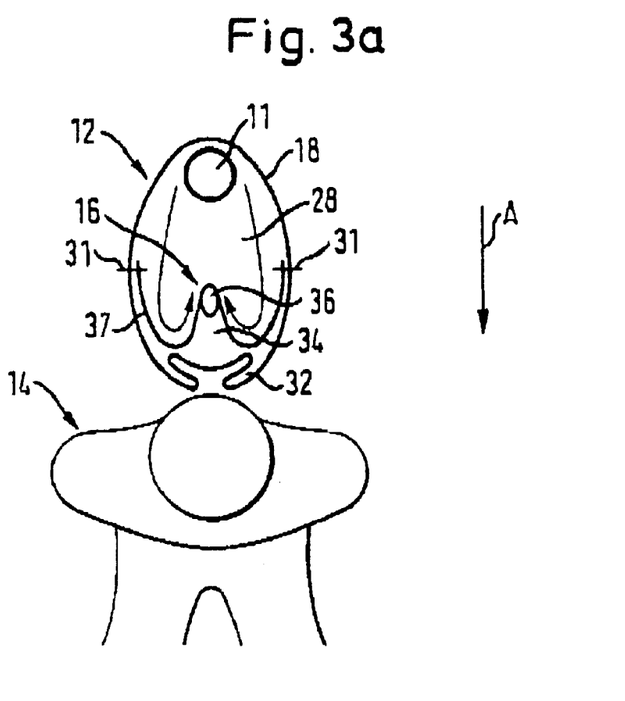
FIGS. 3a and 3b illustrate an airbag arrangement according to yet another embodiment of the invention serving as a side airbag.
Figure 3B:
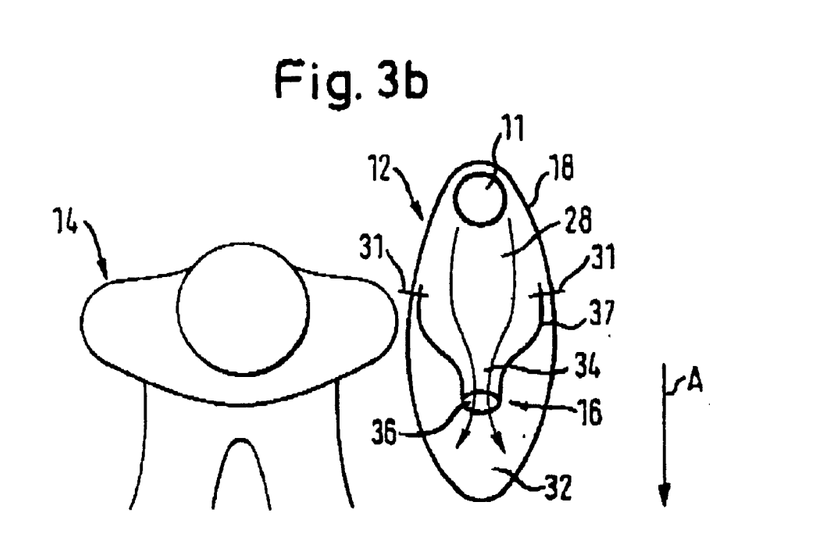

In the embodiment of the invention according to FIGS. 3a and 3b, the arrangement for limiting the unfolding impulse is formed by a valve arrangement or valve 16. The valve 16 is arranged between a primary section 28 and a secondary section 32 of the airbag 12. These two sections 28, 32 of the airbag or the airbag sheath 18 are separated from one another by a separating layer 37 in the form of a material layer sewn on the airbag sheath 18 at connecting points 31. The layer 37 is thus a sheath section of the primary section 28 and of the secondary section 32 of the airbag 12 simultaneously.

The valve 16 is formed by a hose or nozzle section 34 of the layer 37 pushed on or over against the direction of deployment (A) whose free end, which is directed downstream toward the back, in the direction of employment A, and which faces the gas generator 11, is provided with a port 36. The free discharge cross-section of the nozzle section 34 can generally have any desired shape and be, for example, circular in shape.

In the unfolded state according to FIG. 3a, the valve 16 is closed by the folded sheath of the secondary section 32. Gas emitted after the triggering of the gas generator 11, initially in the primary section 28, flows according to the arrows in FIG. 3a into the pocket-like regions to the side of the nozle section 34.

In the OOP case, according to FIG. 3a, the valve 16 cannot free open since the folded secondary section 32 is in the way and cannot unfold due to the occupant 14 blocking the airbag, as shown in FIG. 3a. The valve 16 is thus fixed in its closed state by the resistance of the vehicle occupant 14. As a result, the inflation volume of the airbag 12 is restricted to the part volume of the primary section 28 in the OOP case, whereby the unfolding impulse and thus the inflation force of the airbag 12 is reduced.

In the normal protection case according to FIG. 3b, the vehicle occupant 14 is not in the way of the unfolding of the secondary section 32. The valve 16 can therefore be opened by pushing off the nozzle 34 due to the pressure building up in the primary volume 28 so that the gas can flow into the secondary section 32 via the aperture 36 in the layer 37, as is indicated by the arrows in FIG. 3b.

The valve 16 can also be shaped differently according to the invention and have, for example, the form of a tube, hose, or snorkel. It is also possible to provide different valve mechanisms and to realize the valve function by gills or ripping seams, for example.

Figure 4A:
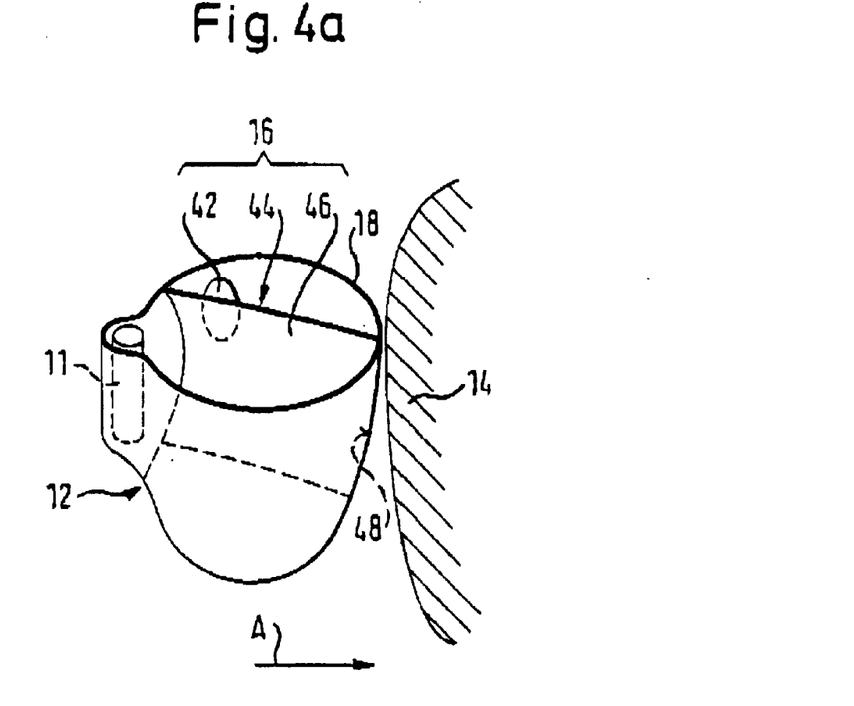
FIGS. 4a and 4b illustrate an airbag arrangement according to yet another embodiment of the invention serving as a side airbag.
Figure 4B:
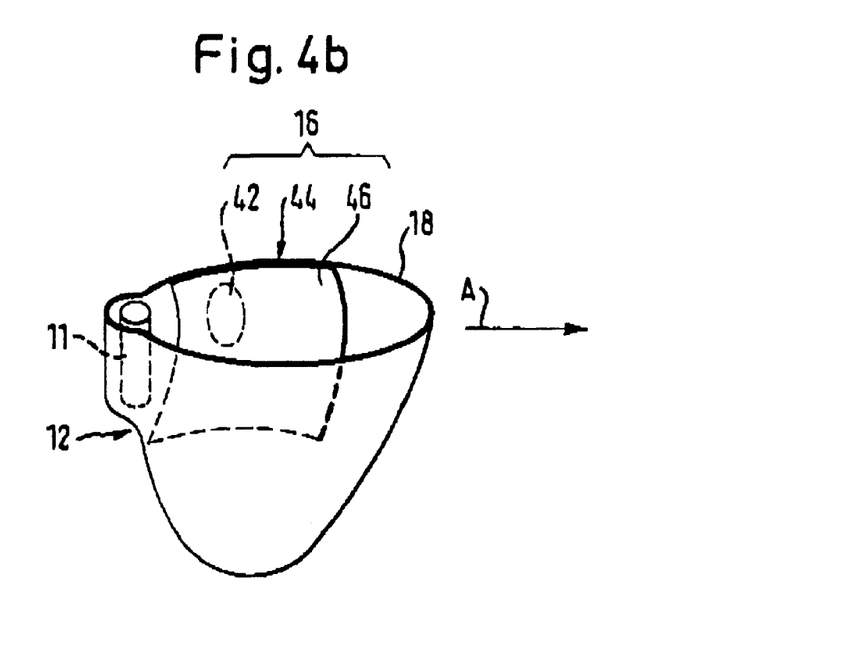

In the embodiment of the invention according to FIGS. 4a and 4b, the arrangement for limiting the unfolding impulse is formed by a discharge aperture 42 formed in the airbag sheath 18 and by a closing arrangement 44 comprising a material layer 46 arranged in the airbag sheath 18. The material layer 46 is releasably connected, for example, sewn, to the airbag sheath 18 with its front end in the direction of deployment A such that it rips off from the airbag sheath 18 in the unhindered unfolding of the airbag 12.

In an OOP case according to FIG. 4a, the airbag 12 cannot unfold unhindered after the triggering of the gas generator since the vehicle occupant 14 forming an obstacle is in its way. The length of the material layer 46 of the closing arrangement 44 is dimensioned with respect to typical OOP cases such that the limited deployment possibility of the airbag 12 does not activate an unfolding of the airbag sheath 18 sufficient to release the connection 48. As a result, the material layer 46 remains in a discharge position inside the airbag 12 in which the gas emitted by the generator 11 into the airbag 12 can escape via the discharge opening 42 of the limitation arrangement. The unfolding impulse and thus the inflation force of the airbag 12 is reduced due to this gas escape possibility given in the OOP case.

Referring to FIG. 4b, in the normal protection case, the material layer 46 is arranged in the airbag 12 and fixed in an inflation-resistant manner to the airbag sheath 18 at a rear region in the direction of deployment A such that the material layer 46 is laid over the discharge aperture 42 with FIG. 4b after the separation of the releasable connection 48 by the unhindered unfolding of the airbag 12. The material 46 is thus automatically switched from its discharge position into a closing position, closing the discharge aperture 42 by the increasing unfolding of the airbag 12 possible in the normal protection case. A gas escape possibility is thereby no longer there so that the airbag 12 can be fully inflated and can move into its protective position.

Figure 5A:
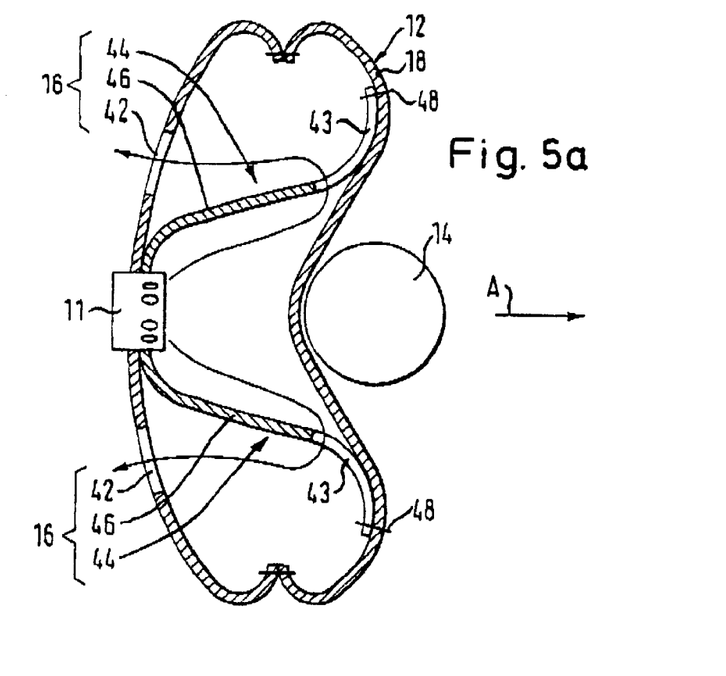
FIGS. 5a and 5b illustrate an airbag arrangement according to yet another embodiment of the invention serving as a front airbag.
Figure 5B:
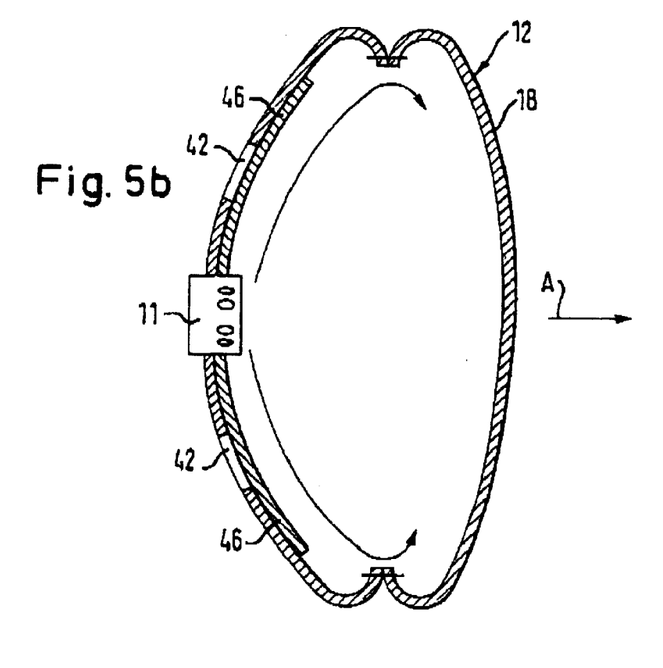

In the embodiment of the invention according to FIGS. 5a and 5b, which is a front airbag arrangement, two or more discharge apertures 42 are formed in the airbag sheath 18 spread around the gas generator 11. A material layer 46 of a closing arrangement arranged in the airbag sheath 18 is associated with each discharge aperture 42. The ends of the material layers 46 in the region of the gas generator 11 are fixed in an inflation-resistant manner to the airbag sheath 18. The other ends of the material layers 46 are releasably connected, for example via a ripping seam, to a region of the airbag sheath 18, which is at the front in the direction of deployment A, at a connecting point 48.

The material layers 46 have at least one port 43 respectively in the region of the connecting point 48 and the gas emitted by the gas generator 11 into the airbag 12 in the OOP case according to FIG. 5a can reach the other side of the material layer 46 via the discharge opening 43 and can thus escape from the airbag 12 via the respective discharge aperture 42, as is indicated by the arrows in FIG. 5a. Generally, the ports 43 of the material layers 46 can also be provided at different positions to the ones shown.

In the OOP case, the vehicle occupant 14 forming an obstacle 14 prevents a movement of the front region of the airbag sheath 18 in the direction of deployment A so that the connections 48 between this region of the airbag sheath 18 and the material layers 46 remain intact. A reduction in the unfolding impulse and thus of the inflation force of the airbag 12 is achieved due to the gas escape possibilities via the ports 43 and the discharge apertures 42.

Referring to FIG. 5b, in the normal protection case, the connections 48 between the front region of the airbag sheath 18 and the material layers 46 are released with an unhindered unfolding of the airbag 12, with the material layers 46 thereupon being laid over the discharge apertures 42 and closing them so that the airbag 12 can be fully inflated.

Figure 6A:
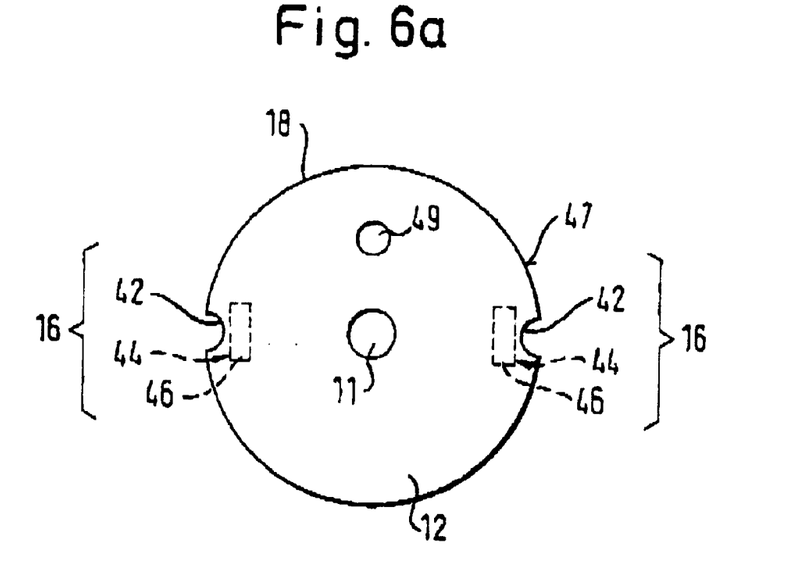
FIGS. 6a and 6b illustrate an airbag arrangement according to yet another embodiment of the invention serving as a front airbag.
Figure 6B:
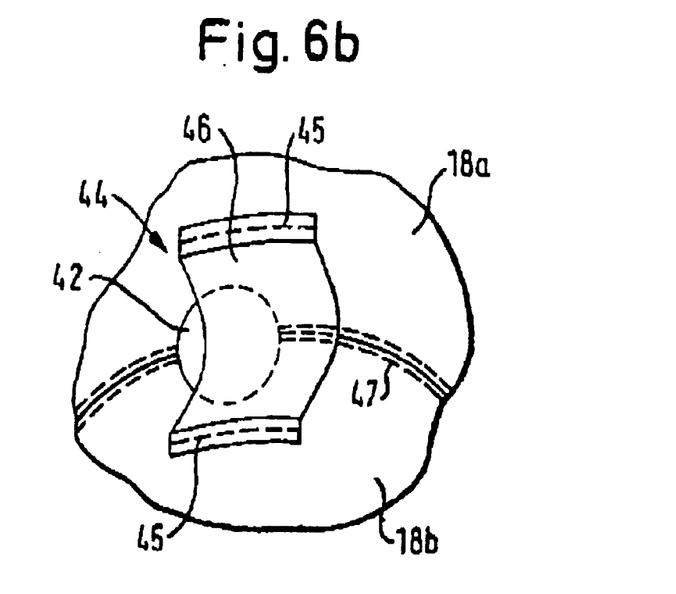

In the embodiment of the invention according to FIGS. 6a and 6b, the closing arrangements 44 of the limitation arrangements according to the invention comprise in each case a material layer 46 connected to the airbag sheath 18 by sewing in such a fixed manner that the connection cannot be released by the unfolding of the airbag 12.

The limitation of the unfolding impulse of the airbag 12 is carried out here by the material layers 46 being respectively arranged in the region of a discharge aperture 42 formed in the airbag sheath 18 and by the material layers 46 being laid over the discharge outlets 42 from a certain unfolding stage.

FIG. 6a shows the areally deployed status of the airbag 12, whose airbag sheath 18 consists of two essentially circular part sheaths 18a, 18b, which are sewn together via a peripheral connecting seam 47 and which lie on top of one another in the deployed state according to FIG. 6a.

As is also shown in FIG. 6b, in which a section of the at least partly inflated airbag 12 is represented, the connecting seam 47 is interrupted by the discharge apertures 42, with the material layer 46 respectively fixed to the part sheaths 18a, 18b via connecting seams extending over and beyond the discharge aperture 42.

The material layers 46 are folded together in the folded state of the airbag 12 such that they do not close the discharge apertures 42. Gas emitted by the gas generator 11 into the airbag 12 can thus escape via the discharge apertures 42 at the beginning of the inflation procedure.

Since the airbag 12 can unfold without hindrance in the normal protection case, the material layers 46 are also unfolded when the airbag sheath 18 unfolds. When a certain advanced inflation stage of the airbag 12 is reached, the material layers 46 are laid over the discharge apertures 42.

Since the discharge aperture 42 are closed from this point in time by the material layers 46 that thus contact the airbag sheath 18 at the inside, the airbag 12 can be fully inflated in the normal protection case.

In the OOP case, in contrast, the airbag 12 is prevented from unfolding freely by a vehicle occupant (not shown) forming an obstacle. The material layers 46 are also not fully unfolded so that the discharge apertures 42 remain open or are only closed later. The unfolding impulse and thus the inflation force of the airbag 12 is reduced in this way in the OOP case.

The material layers 46 thus form closing flaps for the discharge apertures 42. The flaps 46 can be controlled by the unfolding of the airbag 12 and can be switched from a folded discharge position into a closing position closing the discharge apertures by the increasing unfolding of the airbag 12.

Figure 7A:
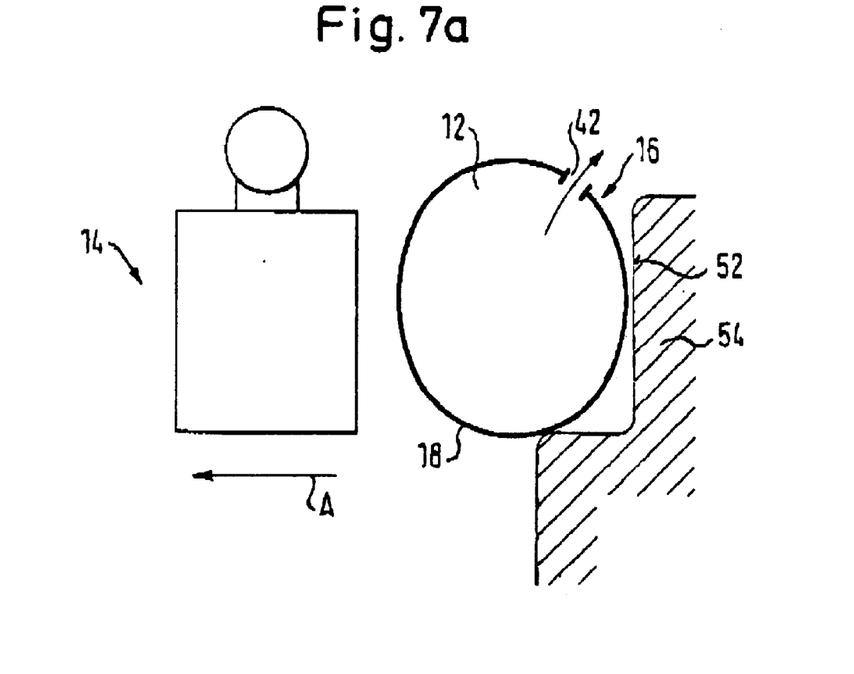
FIGS. 7a and 7b illustrate an airbag arrangement according to yet another embodiment of the invention serving as a side airbag and integrated in a vehicle side panel.
Figure 7B:
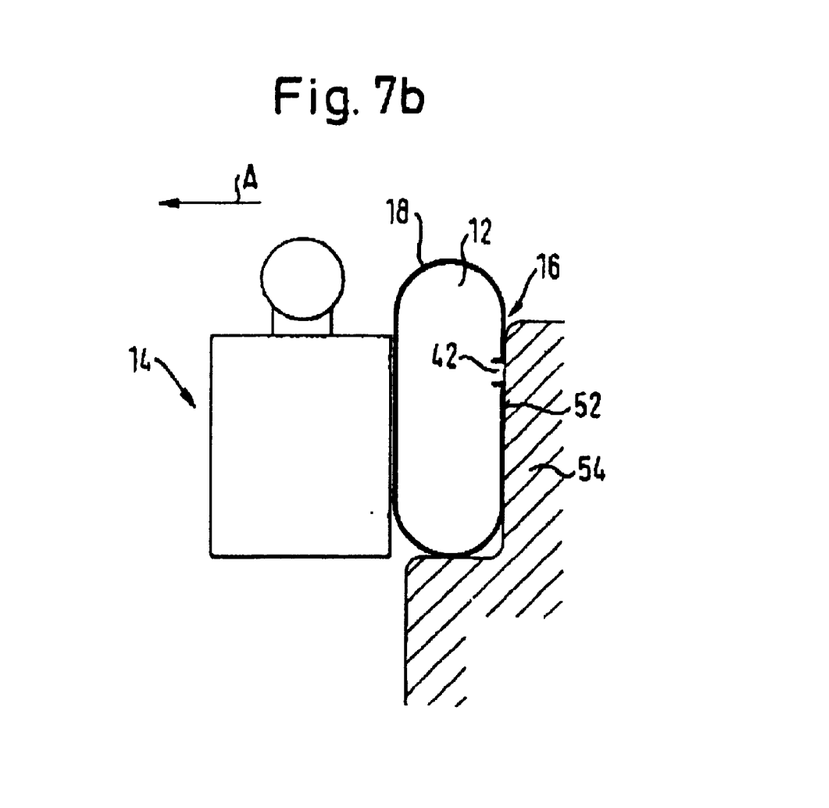

While in the embodiments of the invention described above, the arrangement for the limitation of the unfolding impulse responds in each case to the existing resistance of the vehicle occupant located outside his normal position, the situation applies in the embodiment of the invention according to FIGS. 7a and 7b where the limitation arrangement 16 responds to the lack of resistance of the vehicle occupant 14 located in the normal position.

FIG. 7a shows an OOP case in which the airbag 12, unlike in the normal protection case shown in FIG. 7b, can move away from a side panel 54 of the vehicle without hindrance. The unfolding impulse or the inflation force of the airbag 12 is, however, reduced by at least one discharge aperture 42 in the airbag sheath 18, which aperture forms the limitation arrangement 16 according to the invention, and via which gas can escape from the airbag 12 as indicated by the arrow in FIG. 7a.

The discharge aperture 42 is arranged such that it remains closed by a closing surface 52, which is formed by the vehicle side panel 54 and at which the airbag 12 is supported, in the normal protection case according to FIG. 7b during the inflation of the airbag 12 or in the case of a stress by the occupant 14.

The protective function of the airbag 12 is thus not impaired by the discharge aperture 42 in the normal protection case, whereas a gas escape possibility, which results in a reduction in the unfolding impulse or the inflation force, is provided by the release of the discharge aperture 42 due to the lack of the occupant resistance in the OOP case according to FIG. 7a.

The provision of at least one valve arrangement and/or discharge aperture at the airbag such as was described above with reference to the embodiments of FIGS. 3a, 3b, 4a, 4b, 5a, 5b, 6a, 6b and 7a, 7b, represents in each case a specific embodiment of a further, independent inventive step. This inventive step generally comprises providing an airbag with at least one valve arrangement or gas escape possibility controllable in time by the unfolding of the airbag. The time control means that the gas outlet or outlets are open at the start of the unfolding and are at least partly closed from a certain point in time during unfolding, with closing means of any design generally being able to be provided here. This time control is generally independent of the presence or non-presence of an obstacle such as a vehicle occupant. This further inventive step therefore can be applied to the present embodiments described above in connection with an obstacle.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The disclosure of the priority application DE 100 18 170.8, filed Apr. 12, 2000 in Germany, in its entirety, including the drawings, claims, and the specification thereof, is incorporated herein by reference.

We claim:

1. An airbag arrangement for a motor vehicle, comprising:

at least one inflatable airbag deployable in a direction to protect a vehicle occupant; and at least one arrangement associated with the airbag for limiting an unfolding impulse of the airbag upon an obstacle placed in a deployment path of the airbag to reduce the unfolding impulse transferred to the obstacle, wherein the limitation arrangement comprises an airbag sheath surrounding the airbag, the sheath having a lower degree of unfolding substantially in a direction of the deployment path than perpendicular to the deployment path.

2. An airbag arrangement according to claim 1, wherein the limitation arrangement responds to the resistance of the occupant located in the deployment path, which is outside a normal seating position.

3. An airbag arrangement according to claim 1, wherein the limitation arrangement responds to a lack of resistance from the occupant.

4. An airbag arrangement according to claim 1, wherein the airbag is folded along with the sheath and is arranged areally along a contact surface located in the deployment path, the sheath has an areal contact with the contact surface, which extends at least approximately perpendicular to the airbag deployment path.

5. An airbag arrangement according to claim 4, further including an airbag cover having the contact surface, the airbag being adapted to be arranged at or in a vehicle seat.

6. An airbag arrangement according to claim 5, wherein the airbag cover comprises a seat cover that is initially expandable and adapted to tear upon fully deploying the airbag.

7. An airbag arrangement according to claim 1, wherein the limitation arrangement reacts with the occupant located outside a normal seating position, in the deployment path, so that occupant blocks the deployment path to limit space for deploying the airbag.

8. An airbag arrangement according to claim 7, wherein the limited space configures the airbag to prevent the airbag from reaching a threshold pressure in the airbag, which is only reachable in a normal protection case resulting from opposite external reaction forces generated when the occupant is in a normal seating position.

9. An airbag arrangement according to claim 8, wherein the sheath is folded, at least in part, and wherein a maximum expandability of the sheath in a direction of the deployment path is smaller than that of the airbag.

10. An airbag arrangement according to claim 9, wherein the limitation sheath is adapted to be attached to part of the vehicle at or in which the airbag is positioned, the part being a vehicle seat or a seat cover.

11. An airbag arrangement according to claim 9, wherein the sheath is attached to a module holding the airbag or to the airbag.

12. An airbag arrangement for a motor vehicle, comprising:
- at least one inflatable airbag deployable in a direction to protect a vehicle occupant; and
- at least one arrangement associated with the airbag for limiting an unfolding impulse of the airbag upon an obstacle placed in a deployment path of the airbag to reduce the unfolding impulse transferred to the obstacle,
- wherein the airbag comprises at least two sections, a primary section and a secondary section, that are inflatable sequentially one after another,
- the limitation arrangement comprising a valve formed between the primary and secondary sections, and
- wherein the valve is closed when the airbag is folded and maintained in the folded or partially folded position by an occupant located outside a normal seating position blocking the deployment path and the valve opens by the inflation of the primary section of the airbag, which is inflatable first, when the deployment path is not blocked.

13. An airbag arrangement according to claim 12, wherein the valve is maintained closed when the secondary section is in a folded condition.

14. An airbag arrangement according to claim 13, wherein the valve comprises a nozzle section with at least one aperture, the nozzle section being foldable or bendable against a direction of the deployment path to close the aperture.

15. An airbag arrangement according to claim 14, wherein the nozzle section has a tubular, hose, or snorkel configuration.

16. An airbag arrangement according to claim 12, wherein the primary and the secondary sections are separated from one another with a separating layer arranged in the airbag.

17. An airbag arrangement for a motor vehicle, comprising:
- at least one inflatable airbag deployable in a direction to protect a vehicle occupant; and
- at least one arrangement associated with the airbag for limiting an unfolding impulse of the airbag upon an obstacle placed in a deployment path of the airbag to reduce the unfolding impulse transferred to the obstacle,
- wherein the limitation arrangement comprises at least one discharge aperture formed in the airbag, the aperture being closed when the airbag deploys in the deployment path without the obstacle in the deployment path and the aperture being open so that gas escapes when the obstacle blocks the airbag in the deployment path.

18. An airbag arrangement according to claim 17, wherein the limitation arrangement further includes a closing arrangement for closing the discharge aperture, the closing arrangement being configured to close the aperture when the airbag is deployed without the obstacle in the deployment path.

19. An airbag arrangement according to claim 18, wherein the closing arrangement comprises at least one layer releasably connected to the airbag when the airbag is fully deployed.

20. An airbag arrangement according to claim 19, wherein the one layer is sewn to the airbag.

21. An airbag arrangement according to claim 19, wherein the at least one layer which is releasably connected to a front region of the airbag relative to the direction of deployment, with the layer being fixedly connected to the airbag at a side region and/or at a region at a back region of the airbag relative to the direction of deployment.

22. An airbag arrangement according to claim 19, wherein the layer is fixedly connected to the airbag so that the layer partly closes the aperture when the airbag is at least partly inflated.

23. An airbag arrangement according to claim 19, wherein the airbag has first and second sections connected together forming a seam, the aperture intercepting through the seam and the layer being connected to the first and second sections to cover the aperture.

24. An airbag arrangement according to claim 18, wherein the closing arrangement comprises an external closing surface against which the aperture is engageable, wherein the aperture is arranged in the airbag so that inflating the airbag without any resistance from the occupant prevents the aperture from engaging the external closing surface while inflating the air bag with resistance from the occupant forces the aperture to engage the external closing surface and at least partially close the aperture.

25. An airbag arrangement according to claim 24, wherein the closing surface comprises a side panel of the vehicle or vehicle seat.

26. An airbag arrangement for protecting an occupant of a motor vehicle, comprising:
- an inflatable airbag having a discharge aperture;
- a closing surface adjacent the airbag;
- wherein the discharge aperture is positioned so that the aperture is closed by the surface when the airbag deploys into the occupant in a normal seated position; and
- wherein the discharge aperture is open when the airbag deploys with the occupant in an out of position condition, thereby limiting an unfolding impulse and inflation force from the airbag to the occupant.

27. The arrangement of claim 26, wherein the closing surface comprises a side panel of the vehicle.

* * * * *